US010628807B2

(12) United States Patent
White

(10) Patent No.: US 10,628,807 B2
(45) Date of Patent: Apr. 21, 2020

(54) TECHNIQUES FOR TRANSACTION MANAGEMENT

(71) Applicant: VISA INTERNATIONAL SERVICE ASSOCIATION, San Francisco, CA (US)

(72) Inventor: David J. White, Oakland, CA (US)

(73) Assignee: Visa International Service Association, San Francisco, CA (US)

(*) Notice: Subject to any disclaimer, the term of this patent is extended or adjusted under 35 U.S.C. 154(b) by 812 days.

(21) Appl. No.: 15/238,626

(22) Filed: Aug. 16, 2016

(65) Prior Publication Data

US 2018/0053158 A1   Feb. 22, 2018

(51) Int. Cl.
| | |
|---|---|
| *G06Q 20/36* | (2012.01) |
| *G06Q 20/06* | (2012.01) |
| *G06Q 20/22* | (2012.01) |
| *G06Q 20/38* | (2012.01) |
| *G06Q 20/40* | (2012.01) |

(52) U.S. Cl.
CPC ......... *G06Q 20/065* (2013.01); *G06Q 20/227* (2013.01); *G06Q 20/36* (2013.01); *G06Q 20/3829* (2013.01); *G06Q 20/405* (2013.01)

(58) Field of Classification Search
CPC .... G06Q 20/36; G06Q 20/065; G06Q 20/227; G06Q 20/3829; G06Q 20/405
USPC .......................................................... 705/71
See application file for complete search history.

(56) References Cited

U.S. PATENT DOCUMENTS

| | | | |
|---|---|---|---|
| 7,577,586 B2 | 8/2009 | Frentzel-Beyme | |
| 9,270,736 B2 | 2/2016 | Luciw | |
| 2014/0358776 A1 | 12/2014 | Xu et al. | |
| 2015/0046337 A1 | 2/2015 | Hu et al. | |

(Continued)

FOREIGN PATENT DOCUMENTS

| | | |
|---|---|---|
| WO | 2015135018 | 9/2015 |
| WO | 2015144971 | 10/2015 |

OTHER PUBLICATIONS

Beigel ("What are Inputs and Outputs", https://cointelegraph.com/news/what-are-inputs-and-outputs, Sep. 15, 2014, 5 pages ) (Year: 2014).*

(Continued)

*Primary Examiner* — James D Nigh
(74) *Attorney, Agent, or Firm* — Kilpatrick Townsend & Stockton LLP

(57) ABSTRACT

One embodiment of the invention is directed to a method for allocating and tracking funds to connected devices to enable the connected devices to perform transactions independently. The method may comprise, receiving, at a management computer, an input amount. The input amount may be associated with a first data store. The management computer may allocate one or more segments of the input amount to one or more corresponding connected devices. The management computer may associate the one or more segments with a second data store. In at least one example, the individual segment allocated to a connected device enables the connected device to conduct a transaction. The management computer may provide the allocated segment to the connected device. Later, the management computer may receive a residual segment amount from the device and may deallocate some portion of the segment amount from the device based on the residual segment amount.

20 Claims, 3 Drawing Sheets

(56) References Cited

U.S. PATENT DOCUMENTS

| | | | |
|---|---|---|---|
| 2015/0262176 A1* | 9/2015 | Langschaedel | G06Q 20/065 |
| | | | 705/71 |
| 2016/0148192 A1 | 5/2016 | Storonsky | |
| 2016/0203477 A1 | 7/2016 | Yang et al. | |
| 2016/0234026 A1 | 8/2016 | Wilkins et al. | |
| 2018/0005307 A1* | 1/2018 | Abedin | G06Q 30/0635 |

OTHER PUBLICATIONS

Coinbase ("Why can't I see my transaction in the blockchain?", Retrieved from the Internet Archive using https://support.coinbase.com/customer/portal/articles/1392055-why-can-t-i-see-my-transaction-in-the-blockchain-, (Year: 2014).*

Apodaca, "Five Ways to Lose Money with Bitcoin Change Addresses", retrieved from https://bitzuma.com/posts/five-ways-to-lose-money-with-bitcoin-change-addresses/, 15 pages (Year: 2018).*

EP17841839.8, "Extended European Search Report", dated May 16, 2019, 11 pages.

PCT/US2017/044599, "International Search Report and Written Opinion", dated Dec. 21, 2017, 13 pages.

* cited by examiner

TECHNIQUES FOR TRANSACTION MANAGEMENT

BACKGROUND

Households typically include a number of connected devices and these connected devices have needs to access resources such as goods, services, and data. For example, consumers have refrigerators and/or freezers for storing food, televisions and media players for experiencing entertaining content, washing machines for doing laundry, motor vehicles for transportation, and the like. Recently, "smart" versions of some of these connected devices have been introduced to the public. It has been contemplated that such smart connected devices could be capable of automatically requesting resources such as software updates, goods, or services. However, these connected devices may not have access to information needed for conducting transactions nor the means for ensuring that the consumer's funds are appropriately managed. Additionally, current techniques for tracking crypto-currencies may require each transaction to be reported in a ledger (e.g., a blockchain) that is broadcasted to a community of devices. Given the proliferation of network enabled connected devices, it may prove difficult to manage and track each and every transaction of each and every connected device within system.

Embodiments of the invention address these and other problems, individually and collectively.

BRIEF SUMMARY

Embodiments of the invention can be applied to the "Internet of things" where machines can interact with other machines without human intervention. In particular, embodiments of the invention are directed to managing crypto-currency allocations on behalf of one or more connected devices.

One embodiment of the invention is directed to a method comprising receiving, at a management computer, an input amount. The method may further comprise associating, by the management computer, the input amount with a first data store. The method may further comprise allocating, by the management computer, one or more segments of the input amount to one or more corresponding connected devices. The method may further comprise associating, by the management computer, the one or more segments respectively allocated to the one or more corresponding devices with a second data store, wherein an individual segment allocated to a specific connected device enables the connected device to conduct a transaction. The method may further comprise providing by the management computer to the connected device the individual segment allocated to the specific connected device. The method may further comprise receiving, by the management computer from the specific connected device, a residual segment amount. The method may further comprise deallocating, by the management computer, a portion of the individual segment amount allocated to the specific connected device based on the residual segment amount received.

Another embodiment of the invention is directed to an server computer that comprises a processor, and a computer readable medium coupled to the processor, the computer readable medium comprising code, executable by the processor, for implementing a method. The method may comprise receiving, at a management computer, an input amount. The method may further comprise associating, by the management computer, the input amount with a first data store. The method may further comprise allocating, by the management computer, one or more segments of the input amount to one or more corresponding connected devices. The method may further comprise associating, by the management computer, the one or more segments respectively allocated to the one or more corresponding devices with a second data store, wherein an individual segment allocated to a specific connected device enables the connected device to conduct a transaction. The method may further comprise providing by the management computer to the connected device the individual segment allocated to the specific connected device. The method may further comprise receiving, by the management computer from the specific connected device, a residual segment amount. The method may further comprise deallocating, by the management computer, a portion of the individual segment amount allocated to the specific connected device based on the residual segment amount received.

Another embodiment of the invention is directed to an server computer that comprises a processor, and a computer readable medium coupled to the processor, the computer readable medium comprising code, executable by the processor, for implementing a method. The method may comprise receiving, from a management computer, an allocated amount. The method may further comprise associating, by the client device, the allocated amount with a digital wallet, the method may further comprise receiving, from the management computer, a protocol set that specifies one or more rules associated with spending the allocated amount. The method may further comprise initiating a financial transaction utilizing a portion of the allocated amount, the initiating occurring in accordance with the protocol set. The method may further comprise receiving response information associated with the financial transaction. The method may further comprise reporting, to the management computer, the response information. The method may further comprise transmitting a return message that enables a portion of the allocated amount to be deallocated from the client device, the return message being transmitted according to the protocol set.

These and other embodiments of the invention are described in further detail below.

DETAILED DESCRIPTION

Figure 1:
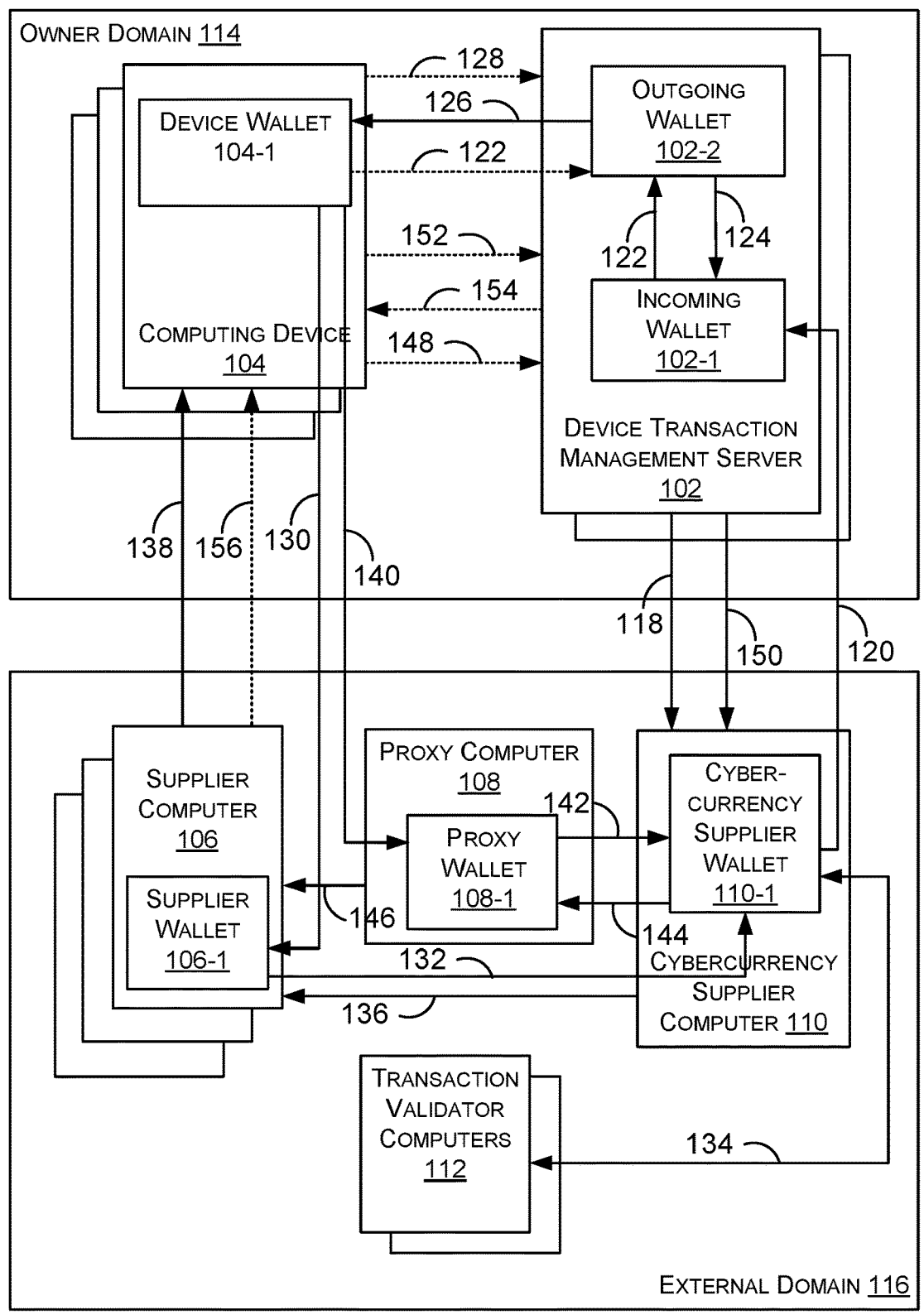
FIG. 1 depicts a flow diagram illustrating block diagram of a system of an embodiment of the invention and a process for conducting a transaction using a device transaction management server in accordance with at least some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Prior to discussing the details of some embodiments of the present invention, description of some terms may be helpful in understanding the various embodiments.

A "connected device" may be any suitable electronic device capable of communicating with, and/or interacting with other devices. A connected device may have a primary function that is unrelated to communicating with other electronic devices. For example, a connected device may be a refrigerator that, in addition to preserving food, is capable of interacting with one or more other electronic devices (e.g., a freezer, a mobile phone, etc.). The device may be associated with a device identifier. The device may be associated with one or more asymmetric keys (e.g., a public/private key pair) that may be used for asymmetric encryption. In some examples, transactions conducted by the connected device may utilize the asymmetric key that enables the transaction to be digitally signed. Examples of connected devices may include gas and electric meters, refrigerators, freezers, lamps, thermostats, printers, automobiles, fire alarms, home medical devices, home alarms, motorcycles, boats, televisions, etc.

"Account data" may refer to any content of an account of a user (e.g., a consumer). In some embodiments, account data may be payment account data that may be utilized to make a purchase (e.g., a purchase for cybercurrency). In other embodiments, account data may include scheduling information associated with the user that indicates suitable days and/or times during which services may be scheduled. In some embodiments, account data may include a shipping address, billing address, or other pertinent information needed to conduct a transaction on behalf of the user. In some examples, account data may include one or more account identifiers. In some embodiments, the account identifier may be a PAN or primary account number. The PAN may be 14, 16, or 18 digits. Account information may also include an expiration date associated with the account, as well as a service code and/or verification values (e.g., CVV, CVV2, dCVV, and dCVV2 values).

Cybercurrency is an electronic currency that is mined or issued. Mined cybercurrencies, such as Bitcoin, do not have any intrinsic value but issued cybercurrencies represent a specific liability against the issuer. The liability may be a promise to exchange the cybercurrency of a specified amount of fiat currency, such as dollars or Euros, it may be a promise to exchange the currency for a mined cybercurrency, such as Bitcoin, or it may be a promise to exchange the currency for some other specified resource of value. Such issued cybercurrencies may be referred to in this document as "cyberscrip". Cyberscrip may be issued by any person or organization, such as a financial institution, but the willingness of other people or organizations to accept the cyberscrip depends on how much they trust the issuer to redeem the cyberscrip as promised. It should be appreciated that the examples included herein may utilize mined cybercurrencies or cyberscrip and the term "cybercurrency" is intended to refer to either type of cybercurrency.

"Registration information" may include data associated with a connected device. For example, registration information may include a device identifier and a protocol set for defining how a connected device may perform resource requests. Registration data may further include a schedule associated with a user, billing information, shipping information, and the like.

"Asymmetric keys," also known as public/private key pairs, are used for asymmetric encryption. In a public-key encryption system, a device can encrypt a message using the public key of the receiver, but such a message can be decrypted only with the receiver's private key. Public-key cryptography systems often rely on cryptographic algorithms based on mathematical problems that currently admit no efficient solution. Message authentication involves hashing a message to produce a "digest," and encrypting the digest with the private key to produce a digital signature. Thereafter another device can verify this signature by 1) computing the hash of the message, 2) decrypting the signature with the signer's public key, and 3) comparing the computed digest with the decrypted digest.

A "digital wallet" refers to an electronic module that allows a connected device to make electronic commerce transactions. In some embodiments, a digital wallet (e.g., an incoming wallet) may record and manage mined and/or issued cybercurrency. In some embodiments, a digital wallet (e.g., an outgoing wallet) may record and manage various cybercurrency amounts that have been allocated to a number of connected devices. In still further embodiments, a digital wallet (e.g., a digital wallet of a connected device) may record cybercurrency amounts that have been allocated to the connected device. Individual digital wallets may be associated with one or more unique asymmetric key pairs. Such digital wallets may be configured to encrypt transaction information (e.g., account data, cybercurrency amounts, an audit trail information indicating a path of the cybercurrency being used for the transaction, etc.).

A "ledger" is an publically-shared electronic record that includes transaction details for transactions conducted using cybercurrency. A ledger may be utilized to verify that cybercurrency is not double-spent. A ledger may be managed by a trusted party on behalf, for example, of a cybercurrency supplier.

A "cybercurrency supplier" may typically refer to an individual or entity that supplies cybercurrency (e.g., mined or issued). In at least one example, a cybercurrency supplier may be a business entity (e.g., a bank) that issues cybercurrency in exchange for a government-recognized currency. The cybercurrency supplier may maintain an account for a user that is associated with a portable communication device such as an account enrolled in a mobile application installed on a portable communication device. As non-limiting examples, a cybercurrency supplier may include a system that issues "house credit" to gaming machines within a casino, a system that issues allowances to devices operated by children in a family, a system that delegates spending authority to autonomous objects (e.g., cars, washing machines, appliances, etc.), and/or the like.

A "supplier" may include any suitable provider of goods and/or services. For example, a supplier may be an electronic repair specialist, an electronic marketplace provider, a grocery store, a cable television provider, or the like. A "supplier computer" is a device that is managed on behalf of a supplier to enable acquisition of the supplier's goods and/or services (e.g., via an API and or a web page). An example of a supplier computer includes a remote server computer that operates a web site operated by the merchant and/or service provider.

A "protocol set" may be a set of rules or configuration settings that indicates one or more actions are allowed and/or should be performed. In some cases, conditions upon which those actions are to be performed. In some embodiments, a protocol set may include conditional statements, such as "if x_condition occurs, then perform y_action." In some embodiments, a protocol set may include spending policies for specifying when and/or what particular transactions should be performed by a particular connected device. For example, upon determining (e.g., via one or more sensors, via past-purchase information, and/or product information) that the consumer's milk is about to expire, a protocol set associated with the refrigerator storing the milk may be utilized to determine that the refrigerator should order another gallon of milk. In this example, the protocol set may be stored at a device transaction management server device that manages the refrigerator and/or funds for the refrigerator, or at least a portion of the protocol set may be provisioned onto the refrigerator locally.

The term "provisioning" may include any preparation and/or configuring of a device to enable it to perform a function. For example, provisioning may include storing rules, protocol sets, and/or instructions on a device to direct the device's actions. In some embodiments, a device may be provisioned with one or more public/private key pairs. A public/private key pair may enable the device to execute transactions on the user's behalf without active input from the user.

A "resource request" is an electronic message that may include any suitable information necessary for requesting a resource (e.g., a purchase/lease of goods, scheduling and/or payment of a service, etc.). In some embodiments, the resource request may be directed to an electronic marketplace/retail entity, or other service provider (e.g., a repair provider) that maintains an internet presence. In some embodiments, a connected device may request a resource (e.g., good(s) or service(s)) by utilizing an application programming interface affiliated with the supplier for which a resource request is directed.

A "resource response" may include any suitable information necessary for providing information regarding a resource request. For example, the resource response may indicate that a resource request was successful or unsuccessful. If unsuccessful, the resource response may indicate a reason that the resource request was unsuccessful (e.g., insufficient cybercurrency).

A "cybercurrency request message" may include any suitable information necessary for requesting cybercurrency from a cybercurrency supplier. In some embodiments, the cybercurrency request message may be directed to a cybercurrency supplier computer from a device transaction management server. The cybercurrency request message may include at least a requested cybercurrency amount and payment information for exchanging real currency for the requested cybercurrency amount.

A "cybercurrency response message" may include any suitable information necessary to issue cybercurrency from one entity to another. In some embodiments, the cybercurrency response message may be directed to a device transaction management server from an cybercurrency supplier computer. The cybercurrency response message may include at least an issued amount of cybercurrency amount or a reason for which the requested cybercurrency amount was not issued (e.g., payment declined).

A "funds request message" may include any suitable information necessary for requesting funds (e.g., cybercurrency). In some embodiments, the funds request may be directed to a device transaction management server. In some embodiments, a connected device may request funds from the device transaction management server. The funds request message may include at least a device identifier (e.g., an IP address, an alphanumeric identifier, etc.) and a requested amount of funds (e.g., cybercurrency).

A "funds allocation message" may include any suitable information necessary for transmitting cybercurrency information to a connected device. In some embodiments, the funds allocation message may be transmitted by a device transaction management server (or a module of the device transaction management server) to a connected device. Upon receipt, a connected device may store an amount indicated in the funds allocation message in a digital wallet of the connected device. The funds allocation message may include at least an allocated amount of cybercurrency amount or a reason for which the requested cybercurrency amount was not allocated (e.g., lack of available funds, the request is in violation of a spending policy associated with the connected device, etc.).

A "split/combine protocol" is a protocol for distributing cybercurrency. In a non-limiting example, ten cyberbucks (CB, an illustrative cybercurrency) may be distributed to 3 different entities, each being associated with a different public/private key pair (e.g., 3 separate digital wallets). A first message is sent to the first entity providing the first entity with 3 CB and a response is sent from the first entity back to the distributor with the 7 CB. Another message is sent to the second entity providing 2 CB of the 7 remaining CB and a response is sent from the second entity back to the distributor with the remaining 5 CB. A third message is sent to the third entity providing the third entity with the remaining 5 CB. Any number of messages may be used in a split/combine protocol as would be appropriate depending on the number of splits/combines.

A "spending request message" may include any suitable information needed for requesting permission to spend an amount of cybercurrency. In at least one embodiment, a spending request message may be transmitted by a connected device to a device transaction management server. The device transaction management server being responsible for managing allocation and tracking of cybercurrency provisioned to one or more connected devices that require resources. The spending request message may include transaction details including at least a purchase amount, a supplier identifier, a connected device identifier, and the like.

A "spending response message" may include any suitable information needed for providing information related to permissions to spend an amount of cybercurrency. In at least one embodiment, a spending response message may be transmitted by a device transaction management server to a connected device. The spending response message can indicate at least whether or not an action associated with the spending request message is allowed or restricted.

An "exchange request message" may include any suitable information needed for requesting an exchange of cybercurrency for real currency. In at least one embodiment, an exchange request message may be transmitted by a supplier computer, or a software/hardware module of the supplier computer to a cybercurrency supplier computer. The exchange request message may include at least an amount of cybercurrency, a requested amount of real currency, an identifier for the requester, or the like.

An "exchange response message" may include any suitable information necessary for providing information regarding an exchange request message for exchanging cybercurrency for real currency. For example, the exchange response message may indicate, at least, that an exchange of cybercurrency for real currency was successful or unsuccessful. If unsuccessful, the exchange response message may indicate a reason that the requested exchange was unsuccessful (e.g., insufficient cybercurrency).

A "return message" may include any suitable information for indicating an amount of cybercurrency to be returned from the connected device. For example, were the connected device to receive a refund from a supplier (e.g., a merchant), and/or were the connected device to determine an excess of funds (e.g., over an allowable threshold), a return message may be sent to the device transaction management server to indicate an amount of cybercurrency that should be deallocated from the connected device. The return message may include at least a refund amount, a supplier identifier, a connected device identifier, and the like.

A "user device" may be an electronic device that is operated by a user. Examples of user devices may include a mobile phone, a smart phone, a personal digital assistant (PDA), a laptop computer, a desktop computer, a server computer, a vehicle such as an automobile, a thin-client device, a tablet PC, etc. Additionally, user devices may be any type of wearable technology device, such as a watch, earpiece, glasses, etc. The user device may include one or more processors capable of processing user input. The user device may also include one or more input sensors for receiving user input. The user device may comprise any electronic device that may be operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "proxy computer" may be an electronic device that can act for another electronic device. In some embodiments, a proxy computer can include any suitable computing device configured to perform transactions with a supplier computer on behalf of a connected device. In some embodiments, the proxy computer may be configured to exchange cybercurrency with a supplier of the cybercurrency (e.g., for a fiat currency such as U.S. Dollars). The proxy device may then utilize the government recognized currency to complete a transaction with a supplier on behalf of the connected device.

A "processor" may refer to any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

Details of some embodiments of the present invention will now be described.

As intelligent connected devices get more powerful and autonomous, there will be an increasing demand for them to be able to automatically request resources as required to perform their functions. This includes replenishing consumables, scheduling maintenance, initiating repair, renewing subscriptions and more. For example, a connected washing machine could automatically order up washing detergent when supplies get low. A "smart" refrigerator could order provisions, such as milk, when supplies are low. Connected devices could also order their own servicing and repairs. In many cases these "resource requests" will need to initiate payment in order to be fulfilled and these payments will be the responsibility of an individual (e.g., a consumer) or organization (e.g., a company). If many such connected devices can initiate payment independently, this could result in a lack of spending control. What is required is a mechanism to manage such spending and ensure that the individual or organization responsible can control such payments. In at least one embodiment, a connected device could generate income. In such cases, a mechanism for handling incoming payments is needed.

Embodiments of the inventions are directed to a device transaction management (DTM) server that manages allocation and tracking of cybercurrency provisioned to one or more connected devices that require resources. In some embodiments, the DTM server may receive registration information (e.g., from a mobile device of the consumer) indicating various device information (e.g., a device identifier) for a number of connected devices. The DTM server may further receive corresponding protocol sets for individual connected devices indicating how funds should be allocated to connected devices and how funds (e.g., cybercurrency) allocated to these connected devices are to be spent. Following receipt of the registration information the DTM server may establish a trusted relationship with the registered connected devices. In at least one example, the DTM server, may request cybercurrency from a cybercurrency supplier in exchange for real currency. In at least one example, the request may be initiated in according with one or more protocol sets managed by the DTM server. On receipt of a confirmation (e.g., by the cybercurrency supplier) that the cybercurrency has been provided, the DTM server may utilize an incoming digital wallet to record incoming cybercurrency funds.

In at least one embodiment, the DTM server may allocate portions (e.g., segments) of the obtained cybercurrency to individual connected devices according to the received protocol sets. Allocated portions (e.g., segments) may be recorded in a separate digital wallet (e.g., an outgoing digital wallet), for example, utilizing a split/combine protocol for distributing cyber-currencies. In at least one example, cybercurrency may be used by the DTM server to one or more user devices (e.g., smartphones operated by a member of a household such as a child). Thus, while examples herein may be directed to delegating spending authority to connected devices, such examples may similarly apply to examples in which specific devices are allocated funds for the user to spend (e.g., allowance issued to a child's smartphone that is subject to a protocol set defining how the allowance may be spent).

In some embodiments, the DTM server may store various protocol sets associated with the connected devices. Accordingly, these connected devices may consult the DTM server for permission (e.g., utilizing a spending request message) to spend at any suitable time. In such cases, the DTM server may allow or restrict such spending according to the stored protocol sets. In other embodiments, the DTM server may transmit a protocol set to a connected device during a transaction allocating cybercurrency to the connected device, upon device initialization, or at any suitable time. In still other embodiments, the DTM server may transmit a protocol set to a connected device in response to receiving a spending request message.

In at least one embodiment, connected devices may initiate a resource request on behalf of a consumer/organization in order to procure goods and/or services. The connected devices may report such resource requests to the DTM server at any suitable time. Additionally, or alternatively, the connected devices may indicate excess funds to the DTM server utilizing a "return message." It should be appreciated that a connected device may initiated the return message and/or the DTM server may illicit the return message by sending a separate message (e.g., a return request message) to the connected device that indicates a request for the connected device to return any excess funds, a particular amount of funds, all funds, or the like. Upon receipt of a return message, the DTM server may record some portion of the returned funds utilizing the incoming wallet. In some examples, the DTM server may reallocate a portion of the returned funds to other connected devices, or the connected device that returned funds, according to the stored protocol sets.

FIG. 1 shows a block diagram of a system 100 according to an embodiment of the invention and a process for conducting a transaction using a device transaction management (DTM) server 102. The system 100 may comprises one or more device transaction management servers (e.g., the DTM server 102), one or more computing devices (e.g., a computing device 104), one or more supplier computers (e.g., a supplier computer 106), one or more proxy computers (e.g., a proxy computer 108), one or more cybercurrency supplier computers (e.g., a cybercurrency supplier computer 110), and one or more transaction validator computers (e.g., transaction validator computers 112). Each of these systems and computers may be in operative communication with each other. For simplicity of illustration, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the Internet), using any suitable communications protocol.

The DTM server 102 may have any suitable characteristics. The DTM server 102 may individually include a processor and a computer readable medium coupled to the processor, the computer readable medium comprising code, executable by the processor for performing the functionality described herein. The DTM server 102 may be communicatively coupled to one or more cybercurrency supplier computers (e.g., the cybercurrency supplier computer 110) and one or more computing devices (e.g., the computing device 104). The DTM server 102 may be configured to perform functions including requesting and receiving cybercurrency from the cybercurrency supplier computer 110. The DTM server 102 may further be configured to perform functions including exchanging information regarding cybercurrency allocations and/or spending permissions with the computing device 104. The DTM server 102 may include one or more software/hardware modules that comprise the incoming wallet 102-1 and the outgoing wallet 102-2. The incoming wallet 102-1 may be configured to store cybercurrency that has been provided to the DTM server 102 by a cybercurrency supplier. The outgoing wallet 102-2 may configured to store information related to cybercurrency that has been allocated by the DTM server 102 to one or more computing devices (e.g., the computing device 104). Each of the incoming wallet 102-1 and the outgoing wallet 102-2 may be associated with one or more public/private key pairs. Cybercurrency transactions processed by the incoming wallet 102-1 and the outgoing wallet 102-2 may be digitally signed utilizing the corresponding private key of a public/private key pair.

The computing device 104 may be an example of a connected device. The computing device 104 may individually include a processor and a computer readable medium coupled to the processor, the computer readable medium comprising code, executable by the processor for performing the functionality described herein. The computing device 104 may be communicatively coupled to the DTM server 102 via a communications medium in order to exchange information with the DTM server 102 regarding cybercurrency allocation, return information, and/or spending permissions. The computing device 104 may be communicatively coupled to the proxy computer 108 and/or the supplier computer 106 via a communications medium in order to exchange various information. The computing device 104 may include one or more software modules that comprise the device wallet 104-1. The device wallet 104-1 may be configured to manage cybercurrency that has been allocated to the computing device. Additionally, the device wallet 104-1 may be utilized during purchase transactions initiated by the computing device 104.

The supplier computer 106 may be associated with any suitable resource provider. The supplier computer 106 may individually include a processor and a computer readable medium coupled to the processor, the computer readable medium comprising code, executable by the processor for performing the functionality described herein. Examples of supplier computer 106 includes any device capable of accessing the Internet an processing information, including a remote server computer. The supplier computer 106 may transmit and/or receive data through the communications medium to at least one of the computing device 104, the proxy computer 108, and/or the cybercurrency supplier computer 110. The supplier computer 106 may include one or more software modules that comprise the supplier wallet 106-1. The supplier wallet 106-1 may be configured to manage cybercurrency and/or government recognized currency that has been transferred to the supplier. The supplier wallet 106-1 may further be configured to provide refunds to, for example, the computing device 104 and/or the proxy computer 108. The supplier wallet 106-1 may be associated with one or more public/private key pairs. Transactions flowing through the supplier wallet 106-1 may be digitally signed utilizing the private key of a public/private key pair.

The proxy computer 108 may be in any suitable form. In at least one example, the proxy computer may be utilized to support suppliers who do not accept the cybercurrency being used. A proxy computer may be viewed as a cybercurrency exchange (e.g., operated by a third-party, the cybercurrency supplier, etc.) and accepts cybercurrency (that is not accepted by the supplier) and send another currency (cybercurrency or real currency that is accepted by the supplier). The proxy computer 108 may individually include a processor and a computer readable medium coupled to the processor, the computer readable medium comprising code, executable by the processor for performing the functionality described herein. The proxy computer 108 may be configured to initiate transactions on behalf of one or more computing devices (e.g., the computing device 104). In some embodiments, the proxy computer 108 can include any suitable computing device configured to initiate transactions with the supplier computer 106 on behalf of the computing device 104. In some embodiments, the proxy computer 108 may be configured to exchange, with the cybercurrency supplier computer 110, cybercurrency for government recognized currency. The proxy computer may then utilize the government recognized currency to complete a transaction with the supplier computer 106 on behalf of the computing device 104. The proxy computer 108 may include one or more software modules that comprise the proxy wallet 108-1. The proxy wallet 108-1 may be configured to receive cybercurrency and request exchange of such cybercurrency for a government recognized currency. In at least on example, such a request may be directed to the cybercurrency supplier wallet 110-1 discussed below. Additionally, the proxy wallet 108-1 may be configured to provide some amount of government recognized currency to the supplier wallet 106-1 during a process for performing a transaction on behalf of the computing device 104. The proxy wallet 108-1 may be associated with one or more public/private key pairs. Transactions flowing through the proxy wallet 108-1 may be digitally signed utilizing the private key of a public/private key pair.

The cybercurrency supplier computer 110 may individually be operated by a corresponding cybercurrency supplier. Typically, a cybercurrency supplier is an entity (e.g., a bank) that issues cybercurrency in exchange for real currency. Although alternatively, the cybercurrency supplier may provide mined cybercurrency. The cybercurrency supplier computer 110 may individually include a processor and a computer readable medium coupled to the processor, the computer readable medium comprising code, executable by the processor for performing the functionality described herein. In at least one embodiment, the cybercurrency supplier computer 110 may be communicatively coupled to the DTM server 102, the supplier computer 106, the proxy computer 108, and/or the transaction validator computers 112. The cybercurrency supplier computer 110 may be configured to issue cybercurrency in response to receiving a cybercurrency request message (e.g., from the DTM server 102). In some embodiments, the cybercurrency supplier computer 110 may be configured to receive an exchange request message from the supplier computer 106 or the proxy computer 108 indicating an amount of cybercurrency to exchange for real (government recognized) currency. The cybercurrency supplier computer 110 may further be configured to provide a cybercurrency response message. The cybercurrency supplier computer 110 may be configured to receive a transaction request (e.g., from the supplier computer 106), the transaction request requesting an exchange of cybercurrency for real currency. Although not pictured, the cybercurrency supplier computer 110 may be configured to send and receive messages to the transaction validator computers 112 in order to send and receive information related to validating an amount of cybercurrency supplied to a particular entity. The cybercurrency supplier computer 110 may include one or more software modules that comprise the cybercurrency supplier wallet 110-1. The cybercurrency supplier wallet 110-1 may be configured manage one or more amounts of cybercurrency on behalf of the cybercurrency supplier. The cybercurrency supplier wallet 110-1 may be associated with one or more public/private key pairs. Transactions flowing through the cybercurrency supplier wallet 110-1 may be digitally signed utilizing the private key of a public/private key pair.

The transaction validator computers 112 may be in any suitable form. The transaction validator computers 112 may individually include a processor and a computer readable medium coupled to the processor, the computer readable medium comprising code, executable by the processor for performing the functionality described herein. The transaction validator computers 112 may be configured to maintain a ledger (e.g., a globally broadcasted ledger) for documenting and validating cybercurrency amounts on behalf on the cybercurrency supplier computer 110. Accordingly, the transaction validator computers 112 may be configured to send and receive information from the cybercurrency supplier computer 110. In at least one embodiment, the transaction validator computers 112 may be operated by a trusted entity to maintain blockchain ledgers.

Messages between the computers, networks, and devices in FIG. 1 may be transmitted using a secure communications protocols such as, but not limited to, File Transfer Protocol (FTP); HyperText Transfer Protocol (HTTP); Secure HyperText Transfer Protocol (HTTPS), Secure Socket Layer (SSL), ISO (e.g., ISO 8583) and/or the like.

Each of the entities in FIG. 1 may communicate through any suitable communication channel or communications network. A suitable communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

According to at least one embodiment, the device transaction manager (DTM) server 102, the computing device 104, and their respective software and/or hardware modules may be included in an owner domain 114. The owner domain 114 may be located, for example, within a user's home, office, vehicle, or the like. The supplier computer 106, the proxy computer 108, the cybercurrency supplier computer 110, and the transaction validator computers 112, may be included in an external domain 116. The external domain 116 may include an external network of devices that are remote with respect to the owner domain 114 (e.g., part of a separate network). In a non-limiting example, the owner domain 114 and the respective devices included therein, may be connected via a home network, while the external domain 116, and the respective devices included therein, may be communicatively coupled to the devices of the owner domain 114 via an external network (e.g., the Internet).

In an environment such as a distributed payment system described herein, at least one embodiment is comparable to a household in which family members (e.g., connected devices) are given allowances (e.g., cybercurrency) to spend either as they wish or with restrictions (e.g., according to a protocol set).

In at least one embodiment, the DTM server 102 may be initiated with one or more protocol sets corresponding to one or more connected devices (e.g., the computing device 104). In other embodiments, a user may provide connected device information and one or more inputs corresponding to a protocol set during a process for registration, described further below with respect to FIG. 3. In some examples, the DTM server 102 may transmit the protocol set to the computing device 104 for storage.

Upon receiving the protocol set and device information, the DTM server 102 may store such information in a data store that is internal or external to the DTM server 102. At a suitable time (e.g., immediately upon receipt or at a suitable time defined in one or more protocol sets) the DTM server 102 may cause a processor to execute instructions to send a cybercurrency request message to the cybercurrency supplier computer 110 at 118. The cybercurrency request message may include payment information to enable the cybercurrency supplier computer 110 to perform a transaction for exchanging real currency for cybercurrency. The cybercurrency supplier computer 110, upon executing a transaction for the exchange may send transaction details (e.g., cybercurrency amount debited/credited, purchaser identifier, cybercurrency supplier, supplier, etc.) to the transaction validator computers 112 at 134. The transaction validator computers 112 individually, or collectively, may be responsible for validating and documenting the amount of cybercurrency supplied to the DTM server 102 according to the transaction details. For example, the transaction validator computers 112, managed by a trusted third party or by the cybercurrency supplier, may validate the transaction and, if valid, add an entry to an electronic ledger (e.g., a blockchain). In some cases, the electronic ledger may be globally transmitted to one or more users as part of a process for maintaining a blockchain.

A "blockchain," as used herein may be used for one or more users (e.g., cybercurrency suppliers) to electronically document cybercurrency transactions. Each user of the blockchain sends and receive cybercurrency transactions to be documented in the blockchain, which is then transmitted to all other users of the blockchain. In this manner, a blockchain may be used to verify cybercurrency transaction amounts so that cybercurrency is not double spent by any one user.

Upon receiving verification from the transaction validator computers 112 that the cybercurrency transaction has been documented/validated, the cybercurrency supplier computer 110 may send a cybercurrency response message to the DTM server 102 at 120. The cybercurrency response message may be received by the incoming wallet 102-1, a component of the DTM server 102. The incoming wallet 102-1 may cause the cybercurrency amount supplied to be recorded. Generally, the incoming wallet 102-1 may maintain records indicating cybercurrency amounts transmitted between the DTM server 102 and the cybercurrency supplier computer 110. Thus, both cybercurrency supplied to the DTM server 102 as well as cybercurrency returned to the cybercurrency supplier computer 110 may be documented by the incoming wallet 102-1.

In at least one embodiment, the use of both an incoming digital wallet and an outgoing digital wallet may provide several benefits. For example, utilizing two digital wallets by the DTM server provides isolation between the connected devices and the DTM server so that they can operate as independently as possible. Without two wallets, currency (e.g., 50 CB) might be sent to a first connected object and the first connected object might eventually send back the change (e.g., 20 CB). Then the DTM might send the change (e.g., 20 CB) to a second connected device and the second connected device might eventually send back the change. Accordingly, distributing cybercurrency (or any currency) would have to occur in a serialized manner with each transaction depending on completion of the transaction before it. This can cost a fair amount of time and failure on any one device may halt the whole distribution process. By utilizing two digital wallets, the resources available to the DTM server (e.g., the cybercurrency in the incoming digital wallet) can be split between individual connected devices by transacting between two internal wallets. This alleviates the need for the DTM server to contact connected devices during allocation. Once the currency has been allocated to the connected devices, the connected devices may receive a message. Accordingly, by splitting the cybercurrency between the incoming digital wallet and the outgoing digital wallet first, sending the actual cybercurrency to each connected device becomes independent, which allows for faster parallel distribution and ensures that failure of one connected device does not impact allocating/sending resources to other connected devices. It should be appreciated that although a split combine protocol is used in several examples herein, any suitable manner of distributing funds between the incoming digital wallet and outgoing digital wallet may be utilized.

Thus, according to some embodiments, the DTM server 102 may execute instructions to determine one or more cybercurrency amounts (e.g., segments of the amount supplied to the DTM server 102) to allocate to one or more connected devices. For example, according to the protocol set, the DTM server 102 may determine that the computing device 104 (e.g., a television) is to be allocated a cybercurrency amount (e.g. a segment including 50 cyberbucks (CB), a cybercurrency used for illustrative purposes). In a non-limiting example, the DTM server 102 may further determine that other connected devices may each be allocated an amount of cybercurrency (e.g., a segment including 20 CB and a segment including 10 CB, respectively). In a non-limiting example, the DTM server 102, upon executing a transaction to obtain 80 CB from the cybercurrency supplier computer 110, may execute instructions that cause the incoming wallet 102-1 and outgoing wallet 102-2 to exchange a number of messages related to a split/combine protocol. For example, the incoming wallet 102-1 may send a first message including the 80 CB to the outgoing wallet 102-2 at 122. The outgoing wallet 102-2 may receive the first message, allocate (by recording) a segment of 50 CB to the computing device 104, and send the remaining 30 CB segment back to the incoming wallet 102-1 at 124. The process may be repeated in order to send a 30 CB segment to the outgoing wallet 102-2 so that a segment of 20 CB may be allocated to a second connected device (e.g., a refrigerator). In this example, the process may be repeated one additional time in order to allocate the remaining segment of 10 CB to a third connected device (e.g., a washing machine). The outgoing wallet 102-2 may record each allocated amount (e.g., each segment) as an association to a connected device. It should be appreciated that none of the messages between the incoming wallet 102-1 and the outgoing wallet 102-2 are reported to the transaction validator computers 112. The allocation process (segmenting process) described above is wholly internal to the owner domain 114. Additionally, each allocation amount (each segment) may individually be digitally signed by the incoming wallet 102-1 (e.g., utilizing the private key of a public/private key pair) as the allocated amount (segment) is transferred to the outgoing wallet 102-2.

In accordance with at least one embodiment, upon allocating cybercurrency to the computing device 104, or at another suitable time (e.g., specified in the protocol set associated with the computing device 104), the outgoing wallet 102-2 may digitally sign and transmit cybercurrency information (e.g., the allocated cybercurrency amount) to the device wallet 104-1 at 126. The device wallet 104-1 may store a record of the allocated funds locally. In some examples, the outgoing wallet 102-2 may execute instructions to cause the protocol set for the computing device 104 to be transmitted along with, or in addition to the cybercurrency information. In other examples, the protocol set was previously stored by the computing device 104 (e.g., in examples where the DTM server 102 transmits the protocol set prior to cybercurrency allocation).

In at least one embodiment, the computing device 104 may transmit a funds request message at 128. The transmission may be in accordance with the protocol set. By way of example, the protocol set for the computing device 104 (e.g., a television) may specify that the computing device 104 is to renew a subscription (e.g., a cable television subscription with a cost of 22 CB) on the $5^{th}$ day of every month. Accordingly, the device wallet 104-1, according to the protocol set, may send a funds request message (e.g., for 22 CB or another amount depending on the protocol set) to the DTM server 102. In response, a funds allocation message to be sent from the outgoing wallet 102-2 to the device wallet 104-1 depicted at 126 enabling the device wallet 104-1 to record the allocated funds.

Returning to the example in which the computing device 104 is to renew a subscription on the $5^{th}$ day of each month, on the $5^{th}$ day of the month, the device wallet 104-1 may determine that the current day is the $5^{th}$ day of the current month. In examples in which the supplier accepts cybercurrency as a valid form a payment, the device wallet 104-1 may digitally sign and submit a resource request to the supplier wallet 106-1 (e.g., operated by cable television provider) at 130. The resource request may contain suitable information such as a cybercurrency amount, a resource requested (e.g., a cable subscription), an account identifier, an audit trail (e.g., indicating a path of digital signatures related to the cybercurrency supplier wallet 110-1, the incoming wallet 102-1, the outgoing wallet 102-2, and the device wallet 104-1) indicating an origin of the supplied cybercurrency (e.g., the cybercurrency supplier), and/or any suitable information needed to procure the resource (e.g., the subscription).

In another example, after determining that an action should be performed (e.g., a resource request should be sent to the supplier computer 106), the computing device 104 may transmit a spending request message to the DTM server 102 at 152. In this example, the DTM server 102 may store some portion of the protocol set for the computing device 104. Accordingly, on receipt of a spending request message, the DTM server 102 may consult the protocol set and either allow or restrict the computing device 104 from sending a resource request. In at least one example, the DTM server 102 may transmit a spending response message at 154, the spending response indicating whether or not the computing device 104 is allowed to send the resource request. It should be understood that although examples discussed herein include renewal of a subscription, the same processes may be performed in any manner of contexts (e.g., item procurement, repair/maintenance, subscription procurement/renewal, etc.).

Upon receipt of a resource request, the supplier wallet 106-1 may digitally sign and transmit an exchange request message to the cybercurrency supplier wallet 110-1 at 132. The transaction request may include a cybercurrency amount, an identifier for the computing device 104, an audit trail indicating the origin of the cybercurrency, or any suitable information needed to exchange cybercurrency supplied to the DTM server 102 for and electronic form of real currency. In at least one example, the cybercurrency supplier wallet 110-1 may validate the transaction request by transmitting the transaction request details (e.g., the audit trail, a transaction amount in cybercurrency, etc.) to the transaction validator computers 112 at 134. The transaction validator computers 112 may be configured to receive the transaction request, verify the audit trail corresponds with cybercurrency supplied to the DTM server 102 by consulting the ledger, document the transaction (e.g., by deducting the transaction amount from the cybercurrency allocated to the DTM server 102 and modifying the ledger to reflect the change), and return an exchange response message to the cybercurrency supplier wallet 110-1 indicating that the transaction was successful (e.g., the transaction amount has been debited from the total cybercurrency funds allocated to the DTM server 102). If the transaction validator computers 112 are unable to validate the transaction request, or if the transaction amount exceeds the cybercurrency amount currently supplied to the DTM server 102, the transaction validator may indicate that the transaction was unsuccessful and no modification of the ledger will take place.

Upon receiving the transaction response message, the cybercurrency supplier wallet 110-1 may transmit a transaction response message at 136 to the supplier wallet 106-1 indicating that the transaction has been successful or unsuccessful. If successful, the cybercurrency supplier wallet 110-1 may include information in the transaction response message that may cause real currency to be transferred from the cybercurrency supplier wallet 110-1 to the supplier wallet 106-1 either immediately, or at a later time. The supplier computer 106 may forward the transaction response message to the computing device 104 at 138. The computing device 104, on receipt of a transaction response message indicating a successful transaction, may cause the device wallet 104-1 to update an amount of allocated cybercurrency.

In another non-limiting example, the supplier wallet 106-1 may not be configured to accept cybercurrency as a valid form of payment. Accordingly, the proxy computer 108 may be utilized to perform a transaction. For example, upon determining that the current day of the month is the $5^{th}$ day of the month, the device wallet 104-1 may submit a resource request to the proxy wallet 108-1 at 140. The resource request may contain suitable information such as a cybercurrency amount, a resource requested (e.g., a cable subscription), an account identifier, an audit trail (e.g., indicating a cybercurrency trail such as the DTM server 102, to the incoming wallet 102-1, to the outgoing wallet 102-2, to the device wallet 104-1) indicating an origin of the cybercurrency (e.g., the DTM server 102), and/or any suitable information needed to procure the resource (e.g., the subscription).

Upon receipt of a resource request, the proxy wallet 108-1 may digitally sign and transmit a transaction request to the cybercurrency supplier wallet 110-1 at 142. The transaction request may include a cybercurrency amount, an identifier for the computing device 104, an audit trail indicating the origin of the cybercurrency, or any suitable information needed to exchange cybercurrency supplied to the DTM server 102 for and electronic form of real currency. In at least one example, the cybercurrency supplier wallet 110-1 may validate the transaction request utilizing the transaction validator computers 112 in the manner described above.

Upon receiving the transaction response message, the cybercurrency supplier wallet 110-1 may transmit a transaction response message to the proxy wallet 108-1 at 144 indicating that the transaction has been successful or unsuccessful. If successful, the proxy computer 108 may send a transaction request to the supplier computer 106 at 146 including information that may cause real currency to be transferred from the cybercurrency supplier wallet 110-1 to the supplier wallet 106-1 either immediately, or at a later time. The supplier computer 106 may send a transaction response message to the computing device 104 at 138 indicating that the transaction was successful. As discussed above, the computing device 104, on receipt of a transaction response message indicating a successful transaction, may cause the device wallet 104-1 to update an amount of allocated cybercurrency. If the transaction is unsuccessful, the proxy computer 108 may send a transaction response message to the computing device 104 indicating that the transaction was unsuccessful (e.g., for lack of funds).

Upon completion of a successful transaction, or according to the protocol set, a determination made be made that the device wallet 104-1 contains excess funds (e.g., unspent funds and/or refunded funds and/or income). Accordingly, the computing device 104 may transmit a return message to the DTM server 102. Receipt of the return message may cause the outgoing wallet 102-2 and the incoming wallet 102-1 to exchange a series of messages to deallocate a returned amount with the computing device 104 or provide income associated with the computing device 104. The DTM server 102 at a time when the returned funds are deallocated with the computing device 104, the income is provided, or at another suitable time (e.g., specified in the protocol set), may transmit a return message to the cybercurrency supplier computer 110 at 150. The return message may be processed by the cybercurrency supplier computer 110 and the excess funds/returned funds/income may be issued to an account of the user.

In at least one example, the computing device 104 may generate income (e.g., such as a washing machine in a public laundromat). Accordingly, the computing device 104 may collect funds from a customer and store such funds in the device wallet 104-1. At a suitable time (e.g., as specified in the protocol set), the computing device 104 may transmit a return message at 148 to transfer its income to the DTM server 102.

At some point in time, a supplier may issue a refund to the computing device 104 at 156. The refund information may be processed by the computing device 104 and the device wallet 104-1 may update a record indicating an amount of funds (e.g., cybercurrency) available to the computing device 104. Upon completion of a successful transaction, or according to the protocol set, a determination made be made that the device wallet 104-1 contains excess funds and the process for returning funds from the device wallet 104-1 to the DTM server 102 may be performed as described above.

Figure 2:
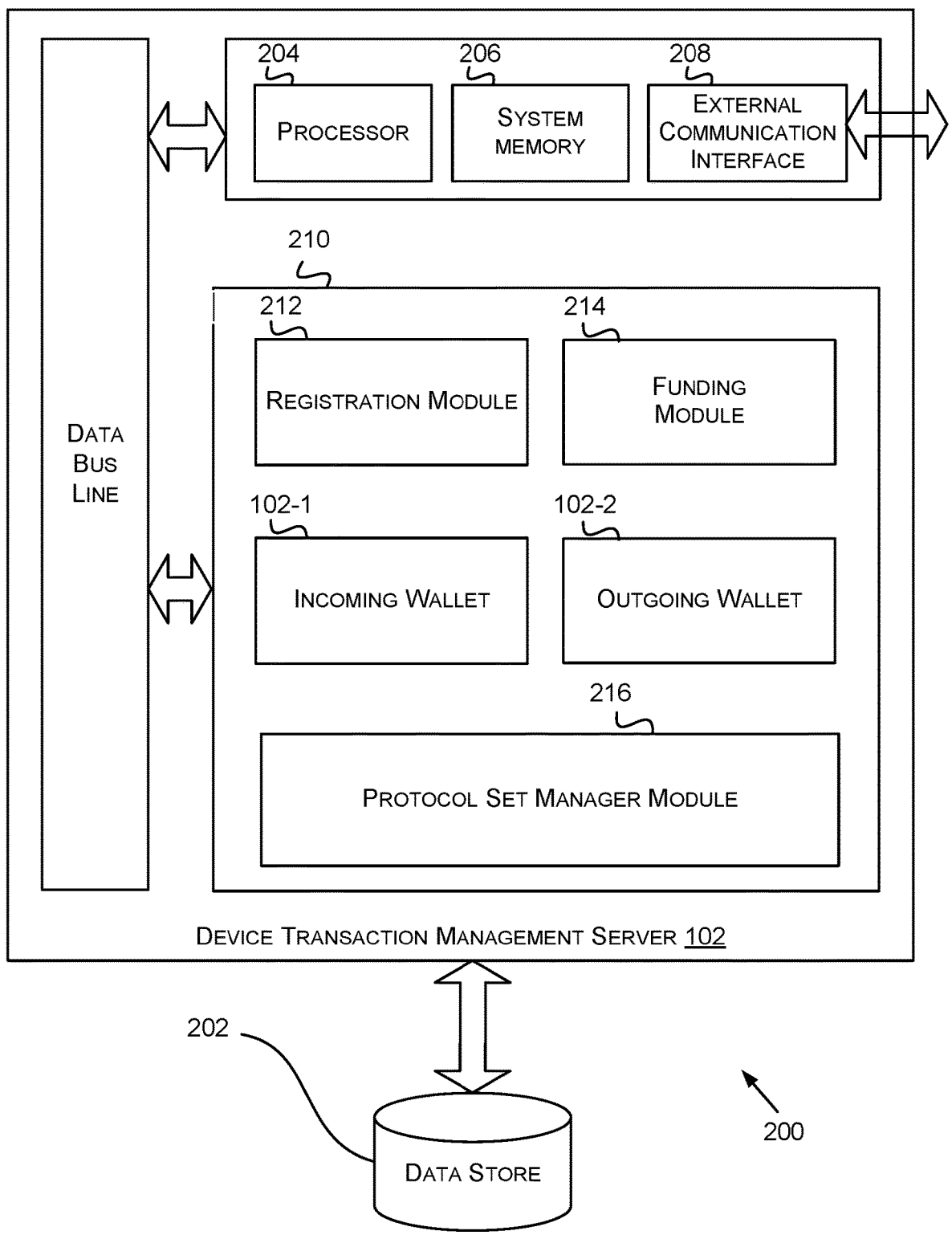
FIG. 2 depicts an example computer architecture capable of implementing at least some embodiments of a device transaction management server.

FIG. 2 depicts an example computer architecture 200 capable of implementing at least some embodiments of a device transaction management server. It should be appreciated that any functionality described with respect to the modules of FIG. 2 may be combined to be performed by a single module or may be performed by a module that is external to the DTM server 102. FIG. 2 shows the DTM server 102 communicatively couple to a data store 202. The data store 202 may be configured as depicted in FIG. 2, or the data store 202 may be provided, in whole or in part, as part of the DTM server 102. The data store 202 may be utilized to store one or more records containing user account information, computing device information (e.g., corresponding to one or more connected devices), protocol sets (e.g., corresponding to one or more connected devices), and/or the like.

The data store 202 (as well as any other database described herein) may be a conventional, fault tolerant, relational, scalable, secure database such as Oracle™ or Sybase™. The data store 202 may be implemented using various standard data-structures, such as an array, hash, (linked) list, structured text file (e.g., XML), table, and/or the like. Such data-structures may be stored in memory and/or in (structured) files. Although the data store 202 is depicted as being external to the DTM server 102, the data store 202 may alternatively be included as internal storage of the DTM server 102.

The DTM server 102 may comprise a processor 204, which may be coupled to a system memory 206 and an external communication interface 208. A computer readable medium 210 may also be operatively coupled to the processor 204.

The computer readable medium 210 may comprise a number of software modules including a registration module 212, a funding module 214, an incoming wallet 102-1 and a protocol set manager module 216

The registration module 212 may comprise code that, when executed, causes the processor 204 to provide a user interface for collecting registration information and/or protocol set information. The registration module 212 may comprise additional code that causes the processor 204 to transmit, receive, and/or store user account information (e.g., payment information, billing address, shipping address, etc.), device information (e.g., IP addresses or other device identifiers corresponding to one or more connected devices), protocol sets (e.g., corresponding to one or more connected devices), and/or the like. For example, the registration module 212 may receive user account information from a user. Such user account information may be collected by an interface provided by a component of the computer readable medium 210. In at least one example, the registration module 212 may transmit user account information to the data store 202 for storage as part of a user account associated with the user. In other examples, the registration module 212 may store user account information as part of a user account associated with the user. Similarly, the registration module 212 may receive device information and/or protocol sets in a same or different message as the user account information. The registration module 212 may cause the processor 204 to execute instructions in order to initiate a trust relationship with the device corresponding to the received device information. The registration module 212 may forward the received protocol sets to the protocol set manager module 216.

The funding module 214 may comprise code that, when executed, causes the processor 204 to transmit funds request messages and receive fund response messages from a cybercurrency supplier computer (e.g., the cybercurrency supplier computer 110 of FIG. 1). In at least one embodiment, the funding module 214 may also be configured to receive and process spending request messages from a computing device (e.g., the computing device 104 of FIG. 1) and transmit spending response messages to a computing device (e.g., the computing device 104 of FIG. 1). The funding module 214 may cause the processor 204 to utilize one or more protocol sets when executing instructions to determine whether to allow or restrict a transaction according to a spending request message.

In at least one embodiment, the protocol set manager module 216 may cause the processor 204 to receive and manage protocol sets corresponding to one or more computing devices (e.g., the computing device 104 of FIG. 1). Upon receipt of a protocol set, or at another suitable time, the protocol set manager module 216 may cause the processor to execute instructions to transmit a portion of the protocol set to a corresponding computing device (e.g., the computing device 104). In at least one example, the protocol set manager module 216 may be configured to receive protocol set updates (e.g., from a user via a user device such as a mobile phone, a laptop computer, or the like). Upon receipt of a protocol set update, the protocol set manager module 216 may cause the processor 204 to update a protocol set (e.g., a protocol set stored in data store 202).

In at least one embodiment, the incoming wallet 102-1 may cause the processor 204 to execute instructions for managing cybercurrency received from and/or transmitted to a cybercurrency supplier computer (e.g., the cybercurrency supplier computer 110 of FIG. 1 or a module of the cybercurrency supplier computer 110 such as the cybercurrency supplier wallet 110-1 of FIG. 1). For example, the incoming wallet 102-1 may be configured to cause the processor 204 to transmit a cybercurrency request message to a cybercurrency supplier computer 110-1. The incoming wallet 102-1 may further be configured to cause the processor 204 to receive a cybercurrency response message and store a cybercurrency amount in a record. In some cases, the incoming wallet 102-1 may cause the processor 204 to store a cybercurrency amount in the data store 202. Still further, the incoming wallet 102-1 may be configured to exchange messages with the outgoing wallet 102-2 during a process for allocating funds to particular computing devices (e.g., the split/combine process described above in connection with FIG. 1). Additionally, the incoming wallet 102-1 may be configured to cause the processor 204 to exchange messages with the outgoing wallet 102-2 as part of the processing of a return message (e.g., cybercurrency deallocation). Additionally, the incoming wallet 102-1 may be configured to cause the processor 204 to exchange messages with the outgoing wallet 102-2 as part of the processing of income received by one or more connected devices.

In at least one embodiment, the outgoing wallet 102-2 may cause the processor 204 to execute instructions for allocating cybercurrency to one or more computing devices (e.g., the computing device 104 of FIG. 1). For example, the outgoing wallet 102-2 be configured to cause the processor 204 to exchange messages with the incoming wallet 102-1 during a process for allocating funds to particular computing devices as discussed above. The outgoing wallet 102-2 may further be configured to cause the processor 204 to store an allocated amount of cybercurrency in a record associated with a computing device. Additionally, the outgoing wallet 102-2 may cause the processor 204 to receive fund request messages from one or more computing devices (e.g., the computing device 104 of FIG. 1). In response to receiving a fund request message, or at another suitable time, the outgoing wallet 102-2 may be configured to cause the processor 204 to send a funds response message to one or more computing devices (e.g., the computing device 104). In at least one example, the outgoing wallet 102-2 may cause the processor 204 to receive a return message. Upon receipt of a return message, the outgoing wallet 102-2 may cause the processor 204 to execute instructions to deallocate an amount of cybercurrency from a computing device (e.g., by updating a record of the allocation). Additionally, the outgoing wallet 102-2 may cause the processor 204 to communicate the deallocation with the incoming wallet 102-1. Additionally, the outgoing wallet 102-2 may be configured to cause the processor 204 to exchange messages with the incoming wallet 102-1 as part of the processing of income received by one or more connected devices.

Figure 3:
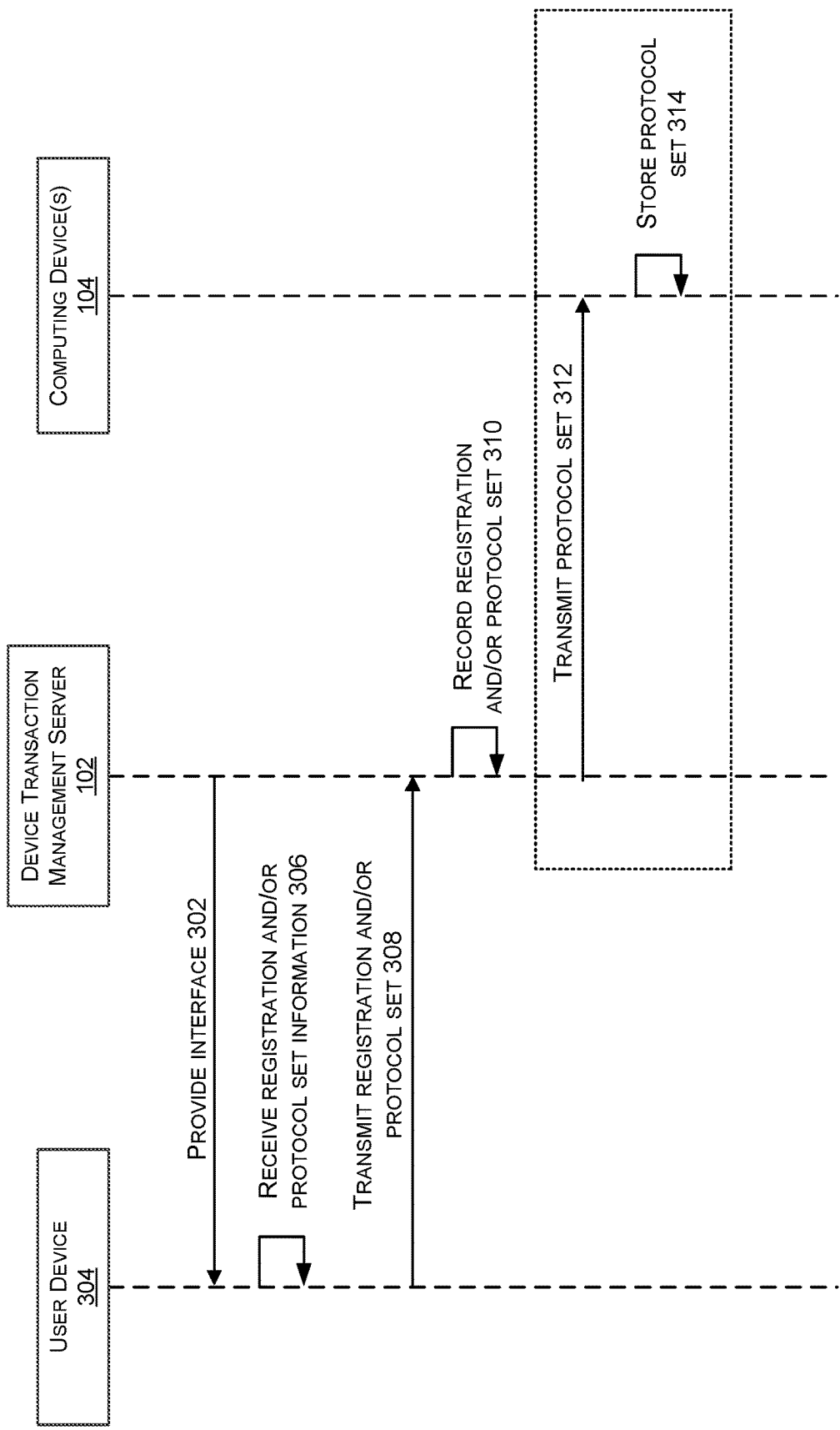
FIG. 3 shows a flow diagram of a method for processing registration information and performing protocol set management.

FIG. 3 shows a flow diagram of a method 300 for processing registration information and performing protocol set management. Additional methods and processes may be included within these methods and may be recognized by one of ordinary skill in the art, in light of the description below. Further, in some embodiments of the present invention, the described methods may be combined, mixed, and matched, as one of ordinary skill would recognize. Although the methods that are specifically described below can relate to payment processing, embodiments of the invention can be applied to other areas that do not require payment.

At 302, the device transaction management (DTM) server 102 of FIG. 1 may provide a user interface to the user device 304. The user device 304 may be any suitable electronic device capable of rendering the provided interface and communicating electronically with the DTM server 102. The user device 304 may receive registration information (e.g., device information related to a number of connected devices such as a refrigerator, a television, a washing machine, a motor vehicle, a toothbrush, a blood pressure machine, and/or the like, billing information, shipping information, etc.) and/or protocol set information at 306. For example, the user may specify, utilizing the provided interface, one or more rules pertaining to an amount of cybercurrency that should be allocated to a particular device at a given time. By way of example, the user may specify that a refrigerator should be allocated 10 increments of cybercurrency every two weeks, a television may be allocated 39.95 increments of cybercurrency per month, a washing machine 12 increments of cybercurrency per month, and a motor vehicle 0 increments of cybercurrency per month. Additionally, the user may specify, utilizing the user interface, one or more rules for the particular devices.

As a non-limiting example, a protocol set may specify that a television may utilize its allocated cybercurrency to renew a cable television subscription on the $5^{th}$ of each month. Another protocol set may specify that the refrigerator may order milk and eggs once every two weeks and/or as the milk and/or eggs expire/run low. Another protocol set may specify that the milk and eggs should be ordered as a combination in one shipping order, or individually as the connected device detects their expiration, low supply, or absence (e.g., absence for a period of time based on, for example, one or more sensor readings). Another protocol set may specify that the motor vehicle may schedule maintenance appointments on the user's behalf as needed or according to a maintenance schedule. In at least one example, a user may input a schedule indicating his or her availability for such appointments in order for the processor of the motor vehicle to avoid overbooking the user. Another protocol set may further specify that the washing machine may order additional laundry products (e.g., detergent, bleach, dryer sheets, stain remover, etc.) as needed (after a particular number of loads, on a periodic basis, as low supply of each product is sensed, etc.). It should be appreciated that the protocol set for each device may vary depending on the device and products used with the device, the subscriptions associated with the device, the repair and/or maintenance needs of the device, or the like.

At 308, the user device 304 may transmit registration and/or protocol set information to the DTM server 102. The DTM server 102 may store the registration and/or protocol set at 310 (e.g., in a record associated with the user and/or a record associated with a device related to the protocol set). By way of example, the DTM server 102 may maintain a user profile associated with the user to store a shipping address, shipping preferences, a user schedule, user preferences, billing information, and the like. In some examples, the DTM server 102 may store such registration information for any number of users. The DTM server 102 may further maintain connected device profiles that store one or more protocol sets corresponding to one or more connected devices (e.g., the computing device 104 of FIG. 1).

By way of example, a refrigerator may be associated with a first protocol set of a first user and a second protocol set of a second user. More specifically, the first protocol set may specify that the refrigerator should be allocated 10 increments of cybercurrency (e.g., utilizing a first user's billing information) in order to purchase yogurt and cheese for the first user according to a first set of rules. The second protocol set may specify that the refrigerator should be allocated 15 increments of cybercurrency per month (e.g., utilizing a second user's billing information) to purchase salami, prosciutto, and pepper jack cheese for the second user according to a second set of rules. Accordingly, multiple users (e.g., family members, roommates, office mates, etc.) may share a connected device as the DTM server 102 is configured to manage allocations to the refrigerator according to separate protocol sets of the respective users. While the DTM server 102 may utilize separate financial accounts for the first and second user, it should be appreciated that the protocol sets may enable the DTM server 102 to procure products/appointments corresponding to different users in a single order (e.g., a single shipping order, a single appointment, etc.).

In at least one example, the DTM server 102 may be configured to transmit a protocol set to the computing device 104 at 312. This transmission may occur as part of the process for allocating cybercurrency to the computing device 104 as discussed in connection with FIG. 1. Additionally, or alternatively, a portion of the protocol set may be transmitted to the computing device 104 in response to receiving a spending request message. Upon receipt, the computing device 104 may store the protocol set at 314. The computing device 104, having store at least a portion of the protocol set locally, may conduct its business independently if appropriate.

Technical Benefits

Embodiments of the present invention may provide the ability for connected devices (e.g., a refrigerator, a vacuum, a freezer, a washing machine, a television, a mobile phone, a motor vehicle, and the like) to independently perform transactions (e.g., schedule maintenance/repair, renew subscriptions, order products, etc.) on behalf of a user. By allocating cybercurrency to each device by way of maintaining an incoming and outgoing wallet, the device transaction management server is able to provide cybercurrency to one or more devices without necessitating reports of these allocations to be communicated to a public ledger (e.g., maintained by a third party). Accordingly, the processes described herein may greatly reduce network traffic and bandwidth of transaction validators responsible for maintaining cybercurrency ledgers.

Example Computer Systems

The various participants and elements described herein may operate one or more computer apparatuses to facilitate the functions described herein. Any of the elements in the above-described FIG. 1, including any servers or databases, may use any suitable number of subsystems to facilitate the functions described herein.

Examples of such subsystems or components shown in the above figures may be interconnected via a system bus. Additional subsystems such as a printer, keyboard, fixed disk (or other memory comprising computer readable media), monitor, which is coupled to display adapter, and others may be included. Peripherals and input/output (I/O) devices, which couple to I/O controller (which can be a processor or other suitable controller), can be connected to the computer system by any number of means known in the art, such as a serial port. For example, the serial port or an external interface can be used to connect the computer apparatus to a wide area network such as the Internet, a mouse input device, or a scanner. The interconnection via system bus allows the central processor to communicate with each subsystem and to control the execution of instructions from system memory or a fixed disk, as well as the exchange of information between subsystems. The system memory and/or the fixed disk may embody a computer readable medium.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
receiving, at a device transaction management computer, an input amount from a cybercurrency supplier computer, the input amount being an amount of cybercurrency that is recorded in a blockchain;
recording, by an incoming digital wallet of the device transaction management computer, the input amount received;
allocating, by the device transaction management computer, a plurality of segments of the input amount to a plurality of corresponding connected devices, wherein allocating the plurality of segments comprises:
exchanging one or more messages of a split/combine protocol between the incoming digital wallet and an outgoing digital wallet; and
recording, by the outgoing digital wallet of the device transaction management computer, the plurality of segments respectively allocated to the plurality of corresponding connected devices;

providing, by the outgoing digital wallet to a specific connected device of the plurality of corresponding connected devices, an individual segment allocated to the specific connected device, wherein providing the individual segment configures the specific connected device to perform a subsequent transaction with a supplier computer;

receiving, by the device transaction management computer from the specific connected device, a residual segment amount; and deallocating, by the device transaction management computer, a portion of the individual segment allocated to the specific connected device based on the residual segment amount received.

2. The method of claim 1, further comprising:

receiving registration information from a user device, the registration information indicating an authorized spending amount and identifiers associated with the plurality of corresponding connected devices; and transmitting, to a cybercurrency supplier, a cybercurrency request message for the input amount, the cybercurrency request message comprising payment information and a requested cybercurrency value.

3. The method of claim 1, wherein the input amount corresponds to a cybercurrency issued by a financial institution associated with the cybercurrency supplier computer.

4. The method of claim 3, wherein the plurality of segments of the input amount are allocated to the plurality of corresponding connected devices without being recorded in the blockchain, and wherein deallocating the individual segment allocated to the specific connected device is performed without being recorded in the blockchain.

5. The method of claim 1, wherein the incoming digital wallet is associated with a first private key and a first public key, and wherein the outgoing digital wallet is associated with a second private key and a second public key.

6. The method of claim 1, wherein associating the plurality of segments allocated to the plurality of corresponding connected devices comprises:

allocating a first segment to a first corresponding connected device;

determining a remaining segment of the first segment, the remaining segment comprising the input amount less the first segment; and allocating a second segment of the remaining segment to a second corresponding connected device, wherein the plurality of corresponding connected devices comprise at least the first corresponding connected device and the second corresponding connected device.

7. The method of claim 1, wherein the residual segment amount of the plurality of segments is received in response to the specific connected device conducting a payment transaction.

8. The method of claim 1, wherein allocating the plurality of segments of the input amount to the plurality of corresponding connected devices comprises transmitting information associated with a specific segment of the plurality of segments to the specific connected device, wherein the information associated with the specific segment includes an amount and one or more spending policies.

9. The method of claim 8, wherein the subsequent transaction is initiated by the specific connected device based at least in part on receiving sensor data, the subsequent transaction being initiated in accordance with the one or more spending policies.

10. The method of claim 1, further comprising:

receiving a spending request from the specific connected device;

determining that the spending request is allowable based at least in part on one or more spending policies maintained by the device transaction management computer; and transmitting an authorization indication in response to determining that the spending request is allowable, wherein the subsequent transaction is initiated by the specific connected device in response to receiving the authorization indication.

11. A server computer, comprising:

a processor, a first digital wallet and a second digital wallet; and a computer readable medium coupled to the processor, the computer readable medium comprising code, executable by the processor, for implementing a method comprising:

receiving an input amount from a cybercurrency supplier computer, the input amount being an amount of cybercurrency that is recorded in a blockchain;

recording, by the first digital wallet, the input amount received;

allocating a plurality of segments of the input amount to a plurality of corresponding connected devices, wherein allocating the plurality of segments comprises:

exchanging one or more messages of a split/combine protocol between the first digital wallet and the second digital wallet; and recording, by the second digital wallet, the plurality of segments respectively allocated to the plurality of corresponding connected devices;

providing, by the second digital wallet to a specific connected device of the plurality of corresponding connected devices, an individual segment allocated to the specific connected device, wherein providing the individual segment configures the specific connected device to perform a subsequent transaction with a supplier computer;

receiving, from the specific connected device, a residual segment amount; and deallocating a portion of the individual segment allocated to the specific connected device based on the residual segment amount received.

12. The server computer of claim 11, the method further comprising:

receiving registration information from a user device, the registration information indicating an authorized spending amount and identifiers associated with the plurality of corresponding connected devices; and transmitting, to a cybercurrency supplier, a cybercurrency request message for the input amount, the cybercurrency request message comprising payment information and a requested cybercurrency value.

13. The server computer of claim 11, wherein the input amount corresponds to a cybercurrency issued by a financial institution associated with the cybercurrency supplier computer.

14. The server computer of claim 13, wherein the plurality of segments of the input amount are allocated to the plurality of corresponding connected devices without being recorded in the blockchain, and wherein deallocating the individual segment allocated to the specific connected device is performed without being recorded in the blockchain.

15. The server computer of claim 11, wherein the first digital wallet is associated with a first private key and a first public key, and wherein the second digital wallet is associated with a second private key and a second public key.

16. The server computer of claim 11, wherein associating the plurality of segments allocated to the plurality of corresponding connected devices comprises:
 allocating a first segment to a first corresponding connected device;
 determining a remaining segment, the remaining segment comprising the input amount less the first segment; and
 allocating a second segment of the remaining segment to a second corresponding connected device, wherein the plurality of corresponding connected devices comprise at least the first corresponding connected device and the second corresponding connected device.

17. The server computer of claim 11, wherein the residual segment amount of the plurality of segments is received in response to the specific connected device conducting a payment transaction.

18. The server computer of claim 11, wherein allocating the plurality of segments of the input amount to the plurality of corresponding connected devices comprises transmitting information associated with a specific segment of the plurality of segments to the specific connected device, wherein the information associated with the specific segment includes an amount and one or more spending policies.

19. The server computer of claim 18, wherein the subsequent transaction is initiated by the specific connected device based at least in part on receiving sensor data, the subsequent transaction being initiated in accordance with the one or more spending policies.

20. The method of claim 7, wherein conducting the payment transaction comprises transmitting, by the specific connected device to a supplier computer, a resource request including a cybercurrency amount and an audit trail indicating an origin of the cybercurrency amount, the origin corresponding to the device transaction management computer, wherein the supplier computer transmits an exchange request message to the cybercurrency supplier computer comprising the cybercurrency amount and the audit trail, the cybercurrency supplier computer being configured to validate the exchange request message utilizing the cybercurrency amount and the audit trail.

* * * * *